T. O'BRYAN.
GUN-CARRIAGE.

No. 187,890.   Patented Feb. 27, 1877.

WITNESSES:
D. P. Cowl
Jno. P. Jacobs

Terrence O'Bryan
INVENTOR.

J. McC. Perkins
ATTORNEY.

UNITED STATES PATENT OFFICE.

TERRENCE O'BRYAN, OF BARNARD, MISSOURI.

IMPROVEMENT IN GUN-CARRIAGES.

Specification forming part of Letters Patent No. 187,890, dated February 27, 1877; application filed December 7, 1876.

*To all whom it may concern:*

Be it known that I, TERRENCE O'BRYAN, of Barnard, in the county of Nodaway and State of Missouri, have invented certain new and useful Improvements in Gun-Carriages; and I do hereby declare that the following is a full, clear, and exact description thereof, that will enable others skilled in the art to which it appertains to make and use the same, reference being had to the accompanying drawings, and to the letters and figures of reference marked thereon, which form a part of this specification.

The same letters and figures of reference are used to indicate the corresponding parts.

After describing the invention, its nature and extent will be shown in the claims.

My invention consists of a gun-carriage, so constructed with useful and novel devices that both men and horses may be protected when in action or on retreat.

Figure 1:
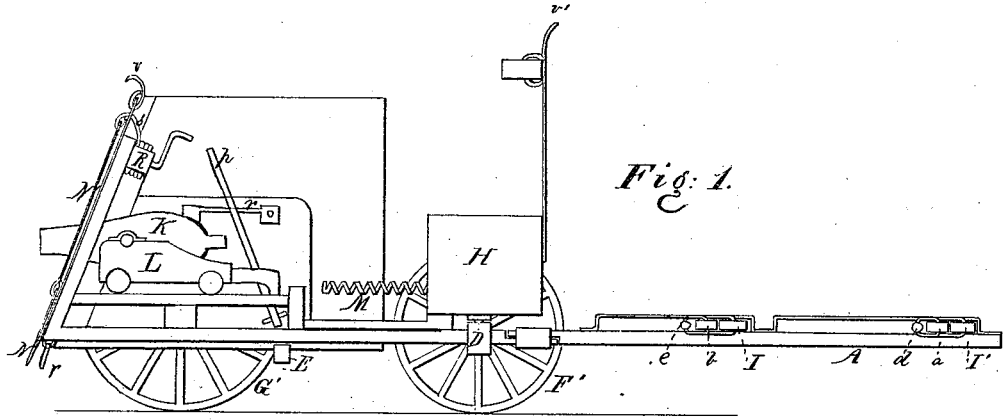
Figure 2:
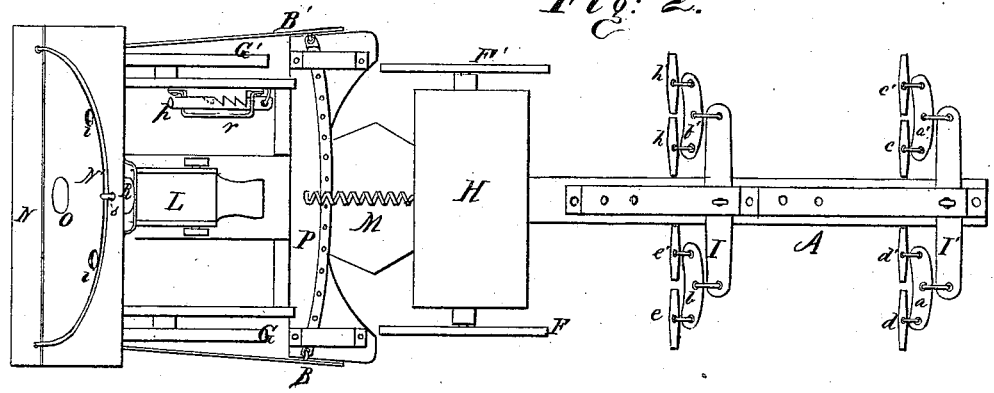
Figure 3:
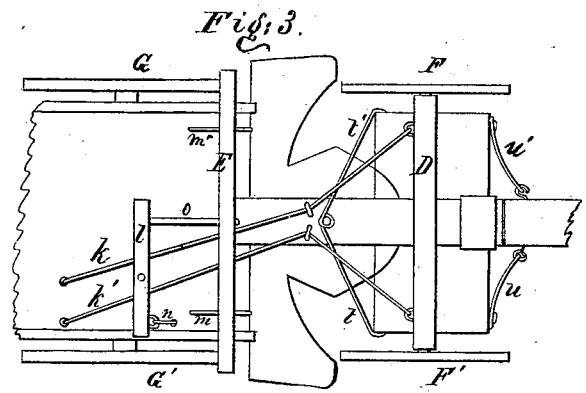
Figure 4:
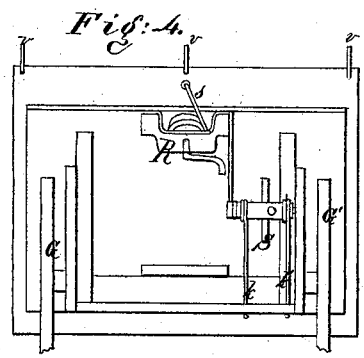

Figure 1 is a side view of my invention with one of the side wings removed. Fig. 2 is a top or plan view. Fig. 3 is a bottom view; and Fig. 4 is a vertical cross-section, looking to the front.

A is the tongue, to which the horses are attached. I I' are the movable and adjustable cross-bars, to which the double-trees are attached.

It will be observed that these double-trees are so attached to the cross-pieces that the horses may move forward or retreat without unhitching them.

L is the gun-carriage, on which rests the gun K, supported in suitable bearings, as shown in the figures. M is a strong spiral spring attached to the caisson H, and designed to act as a check to the recoil of the gun K.

The apron N on the front of the battery can be raised when on the march, or dropped when in battle, by means of the crank-wheel R, to which it is connected by the chain *s*.

The wings B B' are hinged to the inclined front N' of the battery. These wings may be open or closed in battle, as desired. To these wings aprons are attached similar to those in front of the battery. The aprons are, preferably, dropped in action, in order to protect the feet of the horses from the enemy's fire.

To the ring *r* in front of the battery horses may be attached, if desired. O is the hole in front of the battery, which the mouth of the gun or cannon K enters. G G' are the front wheels, and F F' are the rear wheels, of the battery.

The brake-handle *p*, by means of the chain *n*, connects with the centrally-pivoted lever *l*, which clamps the brake E against the wheels G G' by means of the connecting-lever *o*. This brake is especially useful in preventing the recoil of the battery on the horses.

S is the pilot-wheel or capstan, around the shaft of which the chains *k k'* are wound, each in a direction opposite to the other. These chains *k k'* pass down through the bottom or floor of the battery, and, guided by suitable eye-rings in the bottom of the battery, are connected one with each end of the rear axle-tree on which are the wheels F F'.

It is evident that the pilot, by turning the wheel, can, by this novel device, guide the battery in any desired direction.

The limber or tongue A is provided with a double hinge and stay-chains where it is jointed. This allows the tongue to bend in passing through hollows and in short curves on the road.

With my battery the breech-loading gun is preferably used.

Attached to the tops of the wings and front will be an awning of cloth or tin for protection when the weather is not fair.

Having now fully described my invention, what I claim, and desire to secure by Letters Patent, is—

1. A movable battery or gun-carriage, provided with the wings B B' and the inclined front N', the tongue A attached to the rear of the carriage, and the cross-pieces I I', each provided with the double-trees, substantially as described, and for the purposes set forth.

2. The pilot-wheel S, the chains *k k'*, and the axle-tree D, and wheels F F', substantially as described and set forth.

3. The movable apron N and the inclined front N' in combination with the wings B B', substantially as described, and for the purposes set forth.

4. The tongue, constructed as described, to permit the horses to be turned in either direction without unhitching, in combination with the caisson H and carriage provided with the steering mechanism, substantially as described, and for the purposes set forth.

In testimony that I claim the foregoing I have hereunto set my hand this 15th day of August, 1876.

TERRENCE O'BRYAN.

Witnesses:
  J. M. GAVIN,
  M. W. GAVIN.